United States Patent
Luick

(10) Patent No.: US 6,934,831 B2
(45) Date of Patent: Aug. 23, 2005

(54) POWER REDUCTION MECHANISM FOR FLOATING POINT REGISTER FILE READS

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 10/143,311

(22) Filed: May 9, 2002

(65) Prior Publication Data

US 2003/0212880 A1 Nov. 13, 2003

(51) Int. Cl.[7] .................................................. G06F 9/00
(52) U.S. Cl. ...................................... 712/222; 712/233
(58) Field of Search ................................ 712/222, 233, 712/218, 219, 1

(56) References Cited

U.S. PATENT DOCUMENTS 5,685,009 A * 11/1997 Blomgren et al. ............ 712/23
5,974,505 A * 10/1999 Kuttanna et al. ........... 711/118
6,009,511 A * 12/1999 Lynch et al. ................ 712/222

* cited by examiner

Primary Examiner—Henry W. H. Tsai
(74) Attorney, Agent, or Firm—Bockhop & Associates LLC

(57) ABSTRACT

A system and method for reducing power consumed by a floating unit performing iterative calculations in a loop through selectively inhibiting floating point register file reads. One or more source register address values are compared with one or more current values generated from a first iteration of a loop, and upon determining that one ore or more values in the source registers are the same as one or more current generated values, floating point register file reads of the equal values from the one or more source registers are inhibited. The current generated values from the first iteration of the loop are preferably held in one or more pipeline registers.

4 Claims, 2 Drawing Sheets

POWER REDUCTION MECHANISM FOR FLOATING POINT REGISTER FILE READS

BACKGROUND OF THE INVENTION

1. Field of the Invention

The present invention generally relates to computer processors. More particularly, the present invention relates to a system and method to reduce the power consumed by the floating point unit of a processor in inhibiting redundant reads of the floating point register during iterations of a loop, such as in scientific computing, where one or more source operands have not changed in value.

2. Description of the Prior Art

Power conservation is increasingly becoming a concern in both computer systems and processor design. The components of the processor, such as the logic gate transistors, buses and registers, generate heat from their electrical conductance in computer operations. The dramatic increase of chip components on a processor has exacerbated the problems associated with heat generation on the processor, as more components yield more heat during operation.

There have been several attempts in the prior art to alleviate processor power consumption problems. One method is to simply have the processor operate at lower power levels and clock frequency. Another solution has been to create modes within the processor that deactivate system power to components in a computer system when not in use. The processors include power-down circuitry that controls the power delivered to functional units of the processor, and the individual units of the processors have the power cut to them when it is determined that the unit is not necessary during the current operational cycle. However, this system adds to manufacturing costs of the processor, and creates significant overhead in activating and deactivating the units of the processor to affect overall performance of the processor.

One feature provided in state of the art processors is the availability of floating point operations. In early designs, because of processor design complexity, such features were provided via a separate co-processor. In modern processors, such floating-point functionality has been provided in the main processor in a floating point unit, and most modern processors clock the floating point circuitry, even though no floating point operations are currently executed, or floating point registers used. The floating point unit and processor are actuated by micro-code instructions that direct the loading and storing of floating point calculations.

Furthermore, in specific computer programs, a large iterative sequence can reuse the same series of components such that the components can become overheated and damaged from execution of the iterative program. In the example of a DAXBY/Dot Product Loop with an Execution Group of LU: MADD: STU: BC, the instruction cycle from BC→LFDU iterates at each execution of the loop. In numeric intensive computing (NIC), the utilization of the Floating Point Multiply Adder (FPMAD) approaches 100% since the entire FPMAD unit is used each cycle. The modern FPU is a very large unit (64-bit multiply/adder) that at high frequency can dissipate more power than all the other fixed point part of the core. A significant portion of this FPU power is dissipated in the floating point register file and this power is increasing in current designs for several reasons. First, the number of registers in the FPU has grown to as many as 128 or 256 registers for handling software loop unrolling, hardware renaming, multithreading (two sets of registers), VMX (128 128b registers), and other hardware-intensive items, and the register size is likewise increasing to 128 bits. Further, because of high-frequency cycle time pressures caused by the increasing number of physical registers, dynamic logic is usually required for the register file read ports. The power of such a large register file can become a third of the FPU power, which is more than ⅓ of the entire FX unit power if used at 100% utilization, which is a common case in scientific computing. Thus, the power and power density in the FPU are very excessive at clock frequencies above 5 GHz.

It would therefore be advantageous to provide a system and method that can reduce the power consumed in a tight loop of floating point calculations though minimizing unnecessary floating point register reads. Such system and method should be robust and not require significant overhead in processor manufacture or operation. Nor should the system and method unnecessarily operate the circuitry of processor or co-processor in assisting the floating point unit in the iterative calculations. It is thus to the provision of such a system and method that the present invention is primarily directed.

SUMMARY OF THE INVENTION

The present invention is a system and method for reducing power consumed by a floating unit performing iterative calculations in a loop through selectively inhibiting floating point register file reads. One or more source register address values are compared with one or more current values generated from a first iteration of a loop, and upon determining that one or more values in the source registers are the same as one or more current generated values, floating point register file reads of the equal values from the one or more source registers are inhibited. The system for reducing the floating point register file reads during an iterative loop on a processor, where the processor includes a floating point unit having a floating point register and one or more source registers, uses a register read monitor that compares a source register address value with a current value generated from one iteration of a loop, and upon determining that the value in the source register is the same as the current generated value, the monitor inhibits a floating point register file read of the equal value from the one or more source registers.

In a preferred embodiment, the current values generated in the iterative loop are held in a pipeline register, and upon determining that the value in the source register is the same as the current generated value, the monitor inhibits a floating point register file read of the equal value from the one or more source registers and uses the current value in the pipeline register for the next iteration of the loop. If more than one source operand is used in the iterative calculations, the register read monitor compares multiple source register address values with the current values generated from one iteration of a loop, and upon determining that multiple values in the source registers are the same as one or more of the current generated values, the monitor inhibits a floating point register file read of the equal values from the source registers. Further, to prevent an erroneous cascade of an overwritten source register that can occur if the floating point unit writes generated values from calculations to one or more target register addresses, the register read monitor can compare the value in the one or more target registers of the floating point unit with the source registers to determine if the source registers were overwritten and propagate the proper value(s).

The inventive method for reducing the floating point register file reads during an iterative loop on a processor includes the steps of obtaining one or more source operands from the one or more source registers, performing a first calculation of an iterative loop on the obtained source operands to generate one or more current values, obtaining one or more source operands from the one more source registers, comparing the obtained one or more source operands with the current value generated from one iteration of a loop, and then, upon determining that the value of the one or more obtained source operands is the same as the one or more current generated values, selectively inhibiting a floating point register file read of the equal value from the one or more source registers prior to a second calculation of the iterative loop. To make sure that source registers are not overwritten, the method preferably further includes the step of comparing the value in the one or more target registers of the floating point unit with the values in the one or more source registers to determine if the one or more source registers were overwritten.

If the generated values are held in pipeline registers, the method further includes the steps of storing the one or more current values generated in the iterative loop in a pipeline register, and after inhibiting a floating point register file read of the equal value from the one or more source registers, using the current value in the pipeline register for the second calculation of the iterative loop. And when multiple source operands are used in calculations, the method includes the step of comparing the multiple source register address values with two current values generated from one iteration of a loop, and the step of inhibiting a floating point register file read upon determining that any values in the source registers is the same as one or both of the current generated value is inhibiting a floating point register file read of all equal values from the source registers.

The present system and method therefore provides an advantage in that it can reduce the power consumed in a tight loop of floating point calculations through inhibiting floating point register file reads of redundant data, which minimizes the component usage and power consumption during successive iterations. The system and method are robust and do not require significant overhead in processor manufacture or operation. Further, the system and method ensure that erroneous values are not propagated from overwritten values in the source registers.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
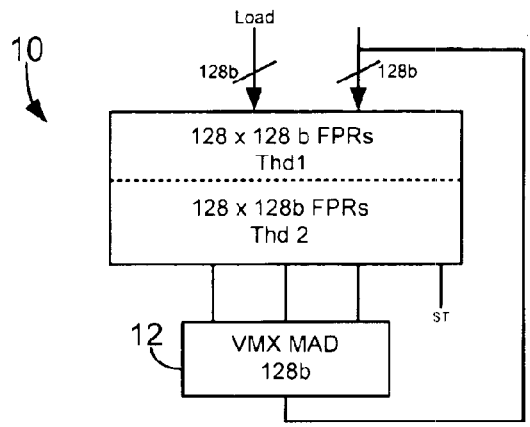
FIG. 1 is a block diagram of a modern floating point unit (FPU).

A preferred embodiment of the invention is now described in detail. Referring to the drawings, like numbers indicate like parts throughout the views, As used in the description herein and throughout the claims, the following terms take the meanings explicitly associated herein, unless the context clearly dictates otherwise: the meaning of "a," "an," and "the" includes plural reference, the meaning of "in" includes "in" and "on."

With reference to the figures in which like numerals represent like elements throughout, FIG. 1 is an exemplary floating point unit (FPU) 10 having two sets of 128b registers, and VMX MAD 12 (128b registers). The FPU is on a common processor that includes the FPU and floating point registers 16, and one or more source registers, such as FRA 18, FRB 20, and FRC 22 in FIG. 2. In FPU 10, 4 read and 2 write ports are required for a single FP unit and 8 read and 4 write ports to support 2 FP units. The present invention allow reduction in overall FPR power consumption during intensive loop processing through recognizing that tight NIC loops follow a strict format type that can be exploited to reduce the number of reads and writes required of the FP register file in the inner loop of a NIC computation.

Figure 2:
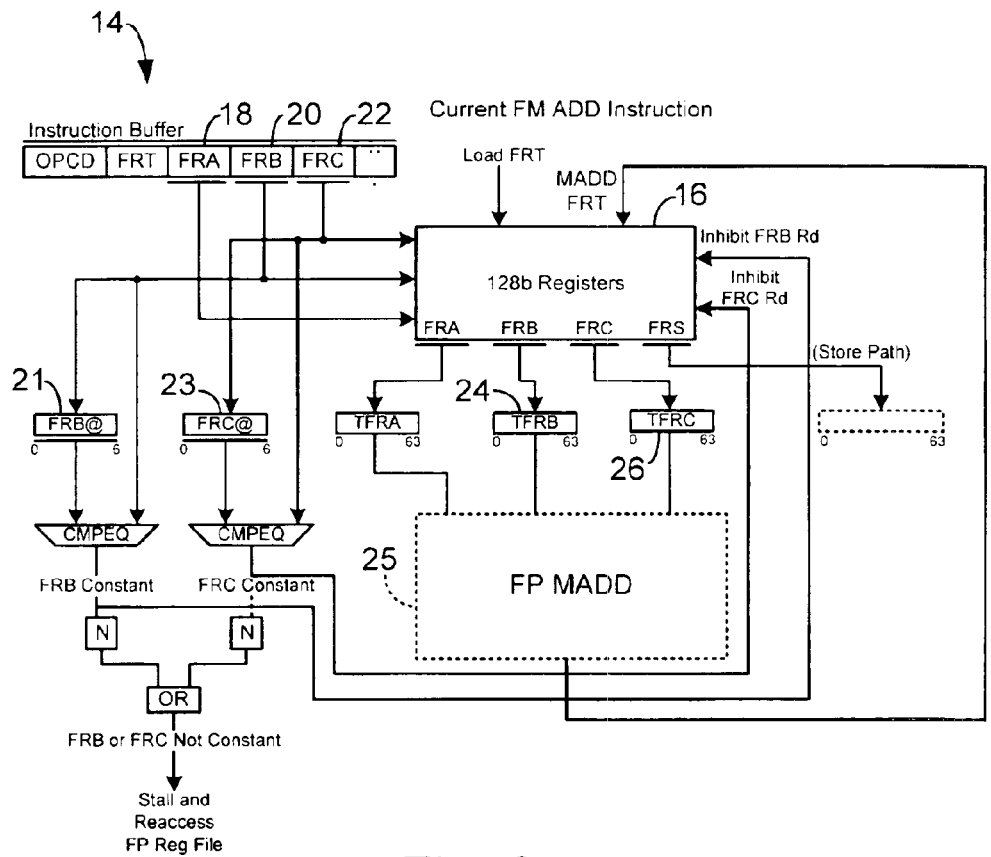
FIG. 2 is a block diagram of the present inventive system for comparing floating point source register values with previous FPMADD iteration register addresses to inhibit a floating point register file read of a redundant value.

As shown in block diagram of FIG. 2, the present invention system 14 comparing floating point register 16 with the source register addresses FRA 18, FRB 20, and FRC 22. FRB 20 and FRC 22 are of a constant value inside the inner loop of DAXPY/Dot Product (as with many other scientific loops). The system 14 compares FRB 20 and FRC 22 source register addresses with the output of the FPMADD 24 from the previous iteration of the loop, and will inhibit ("no-op") the FRB 20 and FRC 22 register file read accesses upon identical values being detected. The system 14 has a register read monitor that compares a source register address value, such as FRB 20, with a current value generated from one iteration of a loop, and upon determining that the value in the source register, such as FRB 20 is the same as the current generated value, such as FRB 21, the monitor inhibits a floating point register file read of the equal value from the one or more source registers, such as FRB 20. In the system 14 shown in FIG. 2, the register read monitor compares two source register values, FRB 20 and FRC 22 with two current values generated from one iteration of a loop (FRB@ 21 and FRC@ 23), and upon determining that one or both values in the source registers are the same as one or both of the current generated values, the monitor inhibiting a floating point register file read of one or both of the equal values from one or both of the source registers (FRB 20 and FRC 22).

Furthermore, the generated values from the first iteration of the loop are held in pipeline registers TFRB 24 and TFRC 26. Accordingly, if the current FPMADD 24 instruction iteration is using the same FP registers for FRB 20 and FRC 22, then those registers need not be reaccessed from the register file and the values in TFRB 24 and TFRC 26 may simply be reused. In operation, the current value generated in the iterative loop is the held in a pipeline register, such as TFRB 24 and TFRC 26, and upon determining that the value in the source registers FRB 20 and FRC 22 is the same as the current generated value, the monitor inhibits a floating point register file read of the equal value from FRB 20 and FRC 22 and uses the current value in the pipeline registers TFRB 24 and TFRB 26 for the next iteration of the loop.

Figure 3:
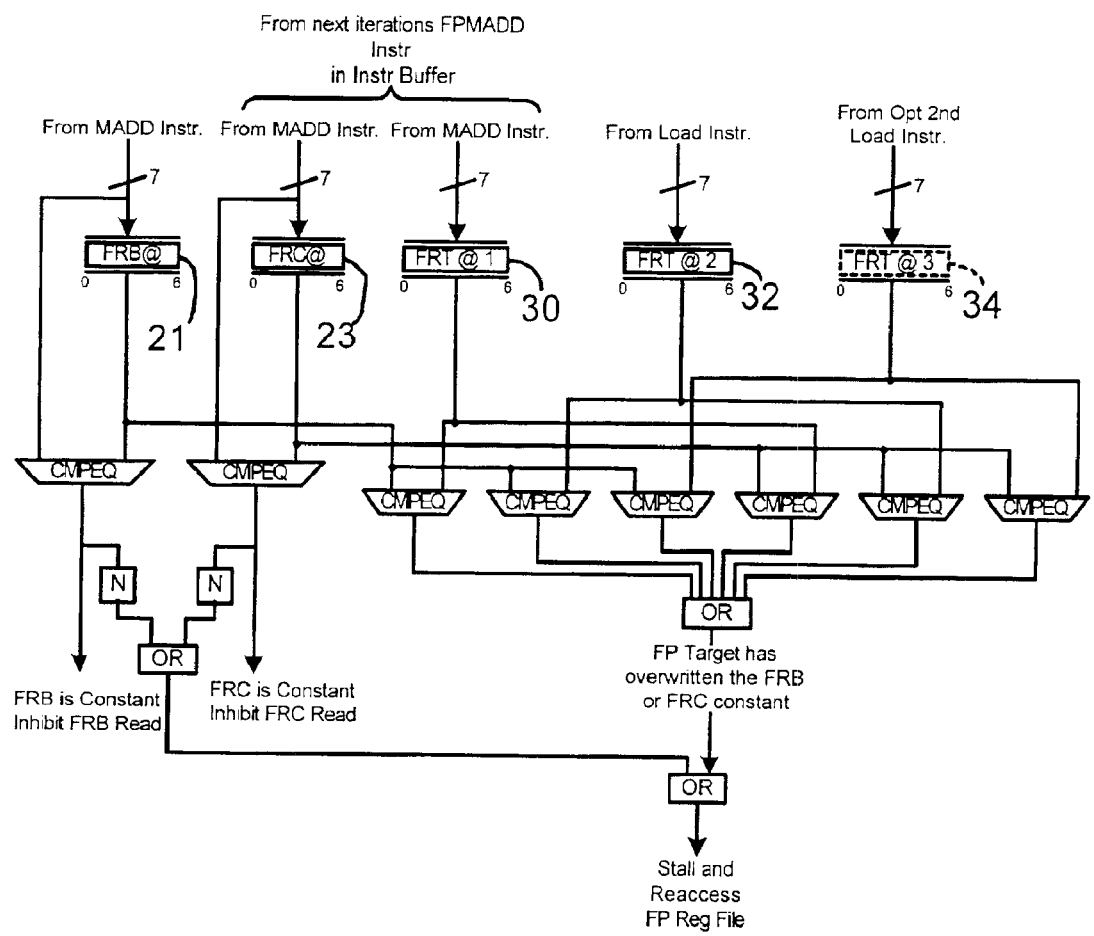
FIG. 3 is a block diagram of an embodiment of the system having constant address compares and target overwrite compares to prevent the read-inhibiting of a source register that has been overwritten.

The system 14 also checks to insure that either the FRB 20 or FRC 22 register has not been overwritten sometime during the loop by a load or FPMADD target. This overwrite can occur on the last couple of iterations if the number of software register names is insufficient. The system 14 must also compare all FP target register addresses (FRTs 30, 32, 34 from loads and FMADDs) against the FRB 20 and FRC 22 register addresses to be sure that the FRB 20 and FRC 22 register numbers were not overwritten. The register read monitor of FIG. 2 can thus incorporate the components of FIG. 3 to further compare the value in the one or more target registers (such as FRTs 30, 32, 34) of the floating point unit 10 with the source registers (FRB 20 and FRC 22) to determine if the source registers were overwritten.

The system 14 consequently allows one-half of the float register file read power to be saved each cycle (iteration) of an unrolled FMADD loop such as DAXBY/Dot Product, which is all that a 2 load/store unit core can sustain as a one cycle/iteration loop. This can reduce overall register file power by up to ⅓ (assuming 2 of 6 ports snooped and read and write powers are equal).

The inventive system 14 accordingly provides a method for reducing the floating point register file reads during an iterative loop on a processor including the steps of obtaining one or more source operands from the one or more source registers, such as FRA 18, FRB 20, and FRC 22; performing a first calculation of an iterative loop on the obtained source operands to generate one or more current values, again obtaining one or more source operands from the one more source registers, comparing the obtained one or more source operands with the current value generated from one iteration of a loop, and upon determining that the value of the one or more obtained source operands is the same as the one or more current generated values, selectively inhibiting a floating point register file read of the equal value from the one or more source registers prior to a second calculation of the iterative loop. In the preferred embodiment, the method also has the steps of storing the one or more current values generated in the iterative loop in a pipeline register, such as TFRB 24 and TFRC 26, and after inhibiting a floating point register file read of the equal value from the one or more source registers (such as FRB 20 and FRC 22), using the current value in the pipeline register for the second calculation of the iterative loop.

In the embodiment, the step of comparing the obtained one or more source operands is comparing two source register values, FRB 20 and FRC 22, with two current values generated from one iteration of a loop, FRB@ 21 and FRC@ 23, and the step of inhibiting a floating point register file read upon determining that one or both values in the source registers are the same as one or both of the current generated value is inhibiting a floating point register file read of one or both of the equal values from one or both of the source registers FRB 20 and FRC 22. To insure that the source registers FRB 20 and FRC 22 are not overwritten, the method also includes the step of, comparing the value in the one or more target registers, FRT@1 30, FRT@2 32, FRT@3 34, of the floating point unit 10 with the values in the one or more source registers, FRB@ 21 and FRC@ 23, to determine if the one or more source registers were overwritten. If FRB@ 21 and FRC@ 23 are the same as any FRT 30, 32, 34, then the system 14 reaccesses the source registers and does not inhibit the floating point file register read.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A system for reducing floating point register file reads during an iterative loop on a processor, comprising:

a processor including a floating point unit having a floating point register, and a source register, the processor capable of selectively executing iterative loops;

a pipeline register that holds a current value generated in the iterative loop; and a register read monitor that compares a source register value with the current value and that inhibits a floating point register file read from the source register upon determining that the source register value is the same as the current value, wherein the processor uses the current value in the pipeline register for a next iteration of the iterative loop upon determining that the value in the source register is the same as the current value in the pipeline register.

2. The system of claim 1, wherein the register read monitor compares two source register values with two current values generated from one iteration of a loop, and upon determining that one or both values in the source registers are the same as one or both of the current generated value, the monitor inhibits a floating point register file read of one or both of the equal values from one or both of the source registers.

3. A method for reducing floating point register file reads during an iterative loop on a processor including a floating point unit having a floating point register, and a source register, the processor selectively executing iterative loops, the method comprising the steps of:

obtaining a source operand from the source register;

performing a first calculation of an iterative loop on the obtained source operand to generate a current value;

comparing the source operand with the current value generated from one iteration of a loop;

selectively inhibiting a floating point register file read from the source register prior to an iteration of the loop upon determining that the value of the source operand is the same as the current value;

storing the current value generated in the iterative loop in a pipeline register; and using the current value in the pipeline resister for the second calculation of the iterative loop after inhibiting a floating point register file read from the source register.

4. The method of claim 3, wherein:

the step of comparing the source operand includes comparing two source register values with two current values generated from one iteration of a loop; and the step of inhibiting a floating point register file read upon determining that the two source register values are the same as one or both the two current values generated from one iteration of a loop includes inhibiting a floating point register file read of one or both of the values from one or both of the source registers.

* * * * *